United States Patent
Biesenbach

[11] 3,742,753
[45] July 3, 1973

[54] METHOD OF CONSTRUCTING A SPARK WHEEL

[76] Inventor: Ginn Biesenbach, 120 Madison Avenue, Reading, Pa.

[22] Filed: Aug. 16, 1972

[21] Appl. No.: 280,954

[52] U.S. Cl............... 72/340, 29/558, 76/101 R, 76/101 A
[51] Int. Cl............................................. B21d 28/00
[58] Field of Search................ 431/273, 274, 269, 431/275, 276, 277, 278; 72/340, 341, 703, 70, 71; 29/DIG. 23, 148.4 D, 78, 103; 76/24, 101 A; 248/59; 148/12.4

[56] References Cited
UNITED STATES PATENTS

| | | | |
|---|---|---|---|
| 2,455,348 | 12/1948 | Barstow | 76/101 A |
| 2,070,730 | 2/1937 | Hellstrom | 76/24 |
| 2,297,983 | 10/1942 | Rea | 148/12.4 |
| 2,098,865 | 11/1937 | Freas | 29/78 |
| 2,497,400 | 2/1950 | Eller | 29/105 |
| 3,528,665 | 9/1970 | Reduch | 274/46 |
| 3,654,692 | 4/1972 | Goetz | 29/558 |

Primary Examiner—Charles W. Lanham
Assistant Examiner—James R. Duzan
Attorney—Arthur A. Jacobs

[57] ABSTRACT

A method of constructing a spark wheel for cigarette lighters and the like which comprises subjecting the peripheral surface of a cylindrical blank to a knurling action to form a series of angular grooves separated by upwardly extending peaks, then cutting the peaks off to form relatively flat land portions between the grooves, and then cutting the land portions by a series of cuts extending parallel to the axis of the blank and angularly intersecting the knurled grooves, to form a series of linearly arranged teeth around the periphery of the blank.

5 Claims, 6 Drawing Figures

PATENTED JUL 3 1973

3,742,753

3,742,753

METHOD OF CONSTRUCTING A SPARK WHEEL

This invention relates to spark wheels adapted to be rotated against a flint to form a spark for igniting either a fuel-fed wick or a jet of inflammable gas, such as used in cigarette lighters and the like, and it particularly relates to a method of producing such spark wheels.

Spark wheels are generally cylindrical objects which have an abrasive peripheral surface. The abrasive surface generally comprises a series of hard teeth or ridges which are arranged in a series of rows across the peripheral surface and which also extend up from the surface in an inclined direction, the inclination of all the teeth being in the same general direction toward the peripheral surface.

The general practice, heretofore, was to manufacture these teeth by "cold chiseling", which is primarily a tedious and difficult operation that involves much manual effort. By this method, two separate chiseling or cutting tools were required in order to form the opposing cuts defining the teeth.

It is one object of the present invention to overcome the difficulties of prior methods of manufacturing spark wheels by providing a method which is relatively simple, rapid and inexpensive and, which eliminates much of the tedious cold chiseling previously required.

Another object of the present invention is to provide a method of the aforesaid type which is more conducive to methods of mass production than was heretofore possible.

Other objects and many of the attendant advantages of this invention will be readily appreciated as the same becomes better understood by reference to the following description when read in conjunction with the accompanying drawings wherein.

Figure 1:
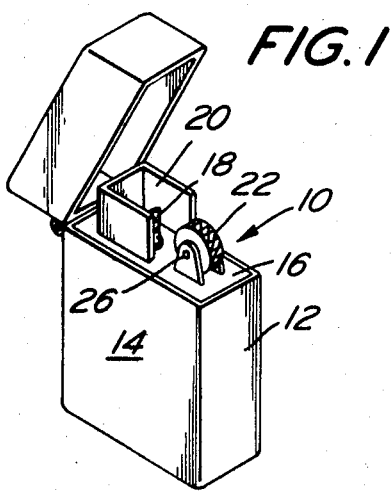
FIG. 1 is a perspective view of a cigarette lighter equipped with a spark wheel embodying the present invention.

Referring now in greater detail to the various figures of the drawings wherein similar reference characters refer to similar parts, there is shown in FIG. 1 a cigarette lighter, generally designated 10, which is, for the most part, of standard construction, and comprises a two-part housing 12 including an outer casing 14 and a hollow insert 16 which is adapted to hold cotton wadding or the like and a wick. The cotton wadding is adapted to be saturated with lighter fluid and enwraps the wick which receives the fluid from the wadding. The end of the wick, indicated at 18, extends through an aperture in the top of the insert 16 and is shielded on three sides by a wind-screen 20. The fourth side is open to sparks emitted from a spark wheel 22 which is rotatable mounted on pin 24 between a pair of spaced ears 26.

The spark wheel 22 had a peripheral, abrasive, sparking surface made of hard metal, such as case hardened, nitrided steel alloy, and, as has been indicated above, this abrasive surface was heretofore, generally formed by cold chiseling methods, whereby abrading teeth were formed in the surface.

Figure 2:
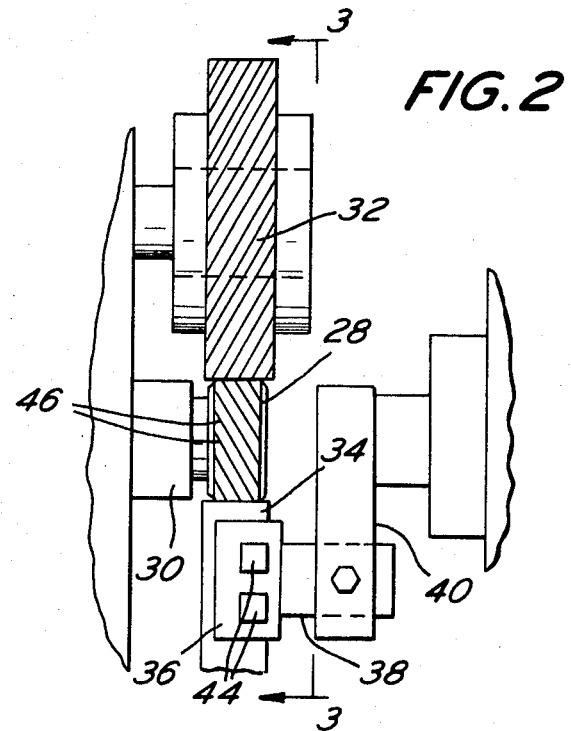
FIG. 2 is a side elevational view showing the basic first steps embodying the method of the present invention.
Figure 3:
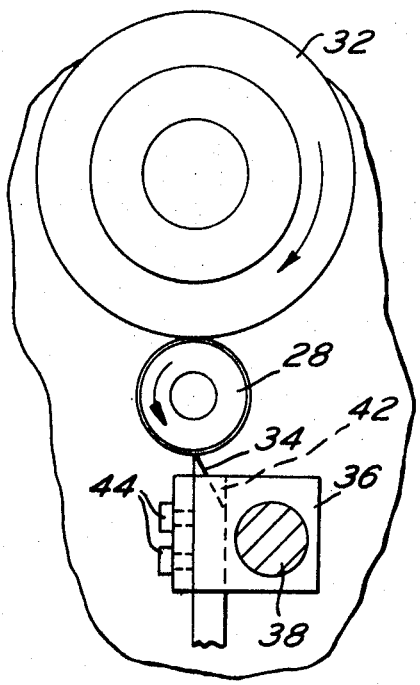
FIG. 3 is a sectional view taken on line 3—3 of FIG. 2.

In accordance with the method of the present invention, the cold chiseling processing is considerably reduced by machine methods. As illustrated in FIGS. 2 and 3, the spark wheel blank, indicated at 28, formed from a solid base, is rotated on spindle 30 between a knurling tool 32 and an oppositely-disposed stationary blade 34. The blade 34 is held in position by a bracket 36 mounted on a rod 38 held by a supporting bracket 40. The blade 34 is releasably held in position in a vertical slot 42 in the bracket 36 by set screws 44 in such manner that the blade may be removed, replaced, or adjusted toward and away from the blank 28.

Figure 4:
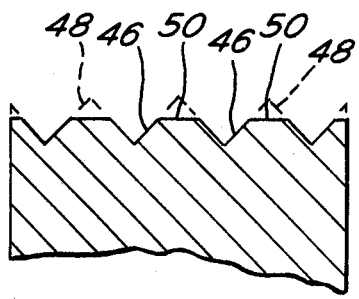
FIG. 4 is a fragmentary, sectional view showing the spark wheel in its intermediate form, after it has been processed in the manner shown in FIGS. 2 and 3.

In operation of the knurling tool 32, as it rotates in conjunction with the rotation of the blank 28, a series of angular grooves 46 are formed in the peripheral surface of the blank. As shown in FIG. 4, the grooves 46 are formed by pressing into the metal of the blank in a swaging action rather than by cutting. The pressure forming the grooves displaces the metal upward between the grooves to from peaks 48 at either side of each groove 46. This is shown in FIG. 4.

As indicated above, the peripheral surface of the spark wheel must be abrasive. Such abrasive surface is formed by upstanding teeth. These teeth must not only extend transversely of the peripheral surface, in general parallelism with the wheel axis, but must also extend in an inclined direction upwardly from the surface, so that when the wheel is rotated relative to the flint, the teeth will not abrade the fingers but will effectively strike against the flint. The knurling action itself does not provide such teeth because it merely provides a series of diagonal grooves which, because the grooves are uninterrupted, retains the relatively smooth contour on the periphery of the wheel. It is, therefore, necessary to provide further steps to form the teeth.

The further steps to form the teeth include, first, the use of the blade 34. As the blank 28 rotates between the knurling tool 32 and the blade 34, the knurling is provided first and then the blade 34 shaves off the peaks 48, formed by the displaced metal of the knurling action. As the blank continues to rotate, the blade 34 continues to shave off the displaced metal formed by the continuous knurling action until, when the blank is completed, flat, plateau-like land portions 50 are provided between each of the knurled grooves (see FIG. 4).

Figures 5, 6:
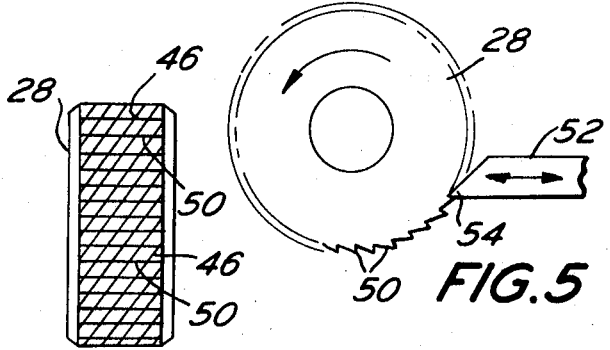
FIG. 5 is a front elevational showing the second step in the method embodying the present invention.
FIG. 6 is an elevational view, showing the completed periphery of the wheel.

In the next step, shown in FIG. 5, the knurled blank is subjected to the action of a blade or chisel 52. In this operation, the blank is rotated in timed relationship with a reciprocating blade 52. The blade 52 cuts into the land portions 50 in a direction which is generally parallel to the axis of the blank and, therefore, at an angle relative to the knurled grooves 46 (as best seen in FIG. 6). The working edge 54 of the blade 52 is inclined on its upper surface and is straight on its lower surface, whereby the land portions 50 are cut in a plane which is inclined relative to the peripheral surface of the blank, so that a series of linearly arranged, inclined teeth are formed.

All of the above steps take place while the metal of the blank is still in a relatively soft or unhardened condition. When these steps have been completed, the blank is then nitrided or case hardened in the standard manner to form the finished wheel.

The invention claimed is:

1. A method of making a spark wheel which comprises knurling the peripheral surface of a cylindrical blank to form alternate, angularly directed grooves and peaks in said peripheral surface, removing the upper portions of said peaks to form flat-topped land portions, cutting said land portions by a series of cuts each of which extends across said peripheral surface in a direction parallel to the axis of said blank and angular to said grooves, each of said cuts forming a line of teeth with each tooth having an upper edge defined by a relatively straight front wall and an inclined rear wall.

2. The method of claim 1 wherein said blank is rotated between a knurling tool adjacent a first peripheral portion of the blank and a shaving tool adjacent a second peripheral portion of the blank, said blank being knurled at said first peripheral portion simultaneously with the removal of said peaks by said shaving tool at the second peripheral portion.

3. The method of claim 2 wherein said shaving tool is stationary but adjustable relative to said blank.

4. The method of claim 1 wherein said cuts are formed by a reciprocable cutting tool which moves in timed relationship with the rotation of said blank while said blank is being rotated relative to said cutting tool.

5. The method of claim 4 wherein said cutting tool has a cutting portion defined by an angular upper edge and a straight lower edge.

* * * * *